(12) United States Patent
Ding et al.

(10) Patent No.: US 11,562,465 B2
(45) Date of Patent: Jan. 24, 2023

(54) PANORAMIC IMAGE STITCHING METHOD AND APPARATUS, TERMINAL AND CORRESPONDING STORAGE MEDIUM

(71) Applicant: KANDAO TECHNOLOGY CO., LTD., Guangdong (CN)

(72) Inventors: Sijie Ding, Shenzhen (CN); Dongfeng Xing, Shenzhen (CN)

(73) Assignee: KANDAO TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/419,303

(22) PCT Filed: Dec. 26, 2019

(86) PCT No.: PCT/CN2019/128675
§ 371 (c)(1),
(2) Date: Jun. 29, 2021

(87) PCT Pub. No.: WO2020/135580
PCT Pub. Date: Jul. 2, 2020

(65) Prior Publication Data
US 2022/0076376 A1 Mar. 10, 2022

(30) Foreign Application Priority Data
Dec. 29, 2018 (CN) .......................... 201811638831.6

(51) Int. Cl.
*G06T 3/40* (2006.01)
*G06T 3/00* (2006.01)
(Continued)

(52) U.S. Cl.
CPC .......... *G06T 3/4038* (2013.01); *G06T 3/0062* (2013.01); *G06T 3/60* (2013.01); *H04N 5/23238* (2013.01)

(58) Field of Classification Search
CPC ..... H04N 5/23238; G06T 3/60; G06T 3/0062; G06T 3/4038
(Continued)

(56) References Cited

U.S. PATENT DOCUMENTS

2007/0122058 A1 5/2007 Kitaura et al.
2019/0014260 A1* 1/2019 Mu ....................... G06T 3/0018

FOREIGN PATENT DOCUMENTS

CN 103763479 4/2014
CN 106355550 1/2017
(Continued)

OTHER PUBLICATIONS

"International Search Report (Form PCT/ISA/210) of PCT/CN2019/128675," dated Mar. 27, 2020, with English translation thereof, pp. 1-4.

*Primary Examiner* — On S Mung
(74) *Attorney, Agent, or Firm* — JCIP Global Inc.

(57) ABSTRACT

The present disclosure provides a panoramic image stitching method, including the steps of acquiring a partial panoramic image taken by each lens; acquiring a first equirectangular rectangular projection graph of each partial panoramic image; performing rotation transformation on the first equirectangular rectangular projection graph of each partial panoramic image to obtain a second equirectangular rectangular projection graph; and adjusting stitching positions of adjacent second equirectangular rectangular projection graphs, and performing stitching operation on the second equirectangular rectangular projection graphs according to the adjusted stitching positions.

17 Claims, 6 Drawing Sheets

(51) Int. Cl.
*G06T 3/60* (2006.01)
*H04N 5/232* (2006.01)

(58) Field of Classification Search
USPC .......................................................... 348/36
See application file for complete search history.

(56) References Cited

FOREIGN PATENT DOCUMENTS

| CN | 106815802 | 6/2017 |
| CN | 107369129 | 11/2017 |

\* cited by examiner

PANORAMIC IMAGE STITCHING METHOD AND APPARATUS, TERMINAL AND CORRESPONDING STORAGE MEDIUM

CROSS-REFERENCE TO RELATED APPLICATION

This application is a 371 of international application of PCT application serial no. PCT/CN2019/128675, filed on Dec. 26, 2019, which claims a priority benefit to China patent application No. 201811638831.6 filed on Dec. 29, 2018. The entirety of each of the above-mentioned patent applications is hereby incorporated by reference herein and made a part of this specification.

BACKGROUND

Technical Field

The present disclosure relates to the technical field of image processing, and particularly relates to a panoramic image stitching method and apparatus, a terminal and a corresponding storage medium.

Description of Related Art

With the development of science and technology, there are more and more scenes using a panoramic camera to photograph panoramic images, and people's requirements for panoramic images are also getting higher and higher.

Existing panoramic images are generally taken with a dual-lens panoramic camera or a multi-lens panoramic camera. Generally, multiple lenses of the dual-lens panoramic camera or the multi-lens panoramic camera are on a same horizontal plane, and each lens is responsible for a panoramic image at a corresponding angle. The panoramic images at the corresponding angles taken by each lens are synthesized to form a corresponding 360-degree panoramic image.

In order to ensure the image quality of the synthesized 360-degree panoramic image, the multiple lenses of the dual-lens panoramic camera or the multi-lens panoramic camera are generally set close, such as 25-55 mm. However, even with this design, during stitching of the panoramic images, since included angles of sight lines of adjacent lenses watching nearby objects are different, an object at an edge of each panoramic image may still has the problem of ghosting.

Therefore, it is necessary to provide a panoramic image stitching method and apparatus to solve the problem in the prior art.

SUMMARY

The embodiments of the present disclosure provide a panoramic image stitching method and apparatus, which are capable of well eliminating a ghosting phenomenon to solve the technical problem that an existing panoramic image stitching method and apparatus would generate the ghosting phenomenon during stitching of panoramic images.

The embodiments of the present disclosure provide a panoramic image stitching method used to perform stitching operation on panoramic images taken by each lens in a multi-lens panoramic camera. The method includes the following steps:

acquiring a partial panoramic image taken by each lens;

performing equirectangular expansion on each partial panoramic image to acquire a first equirectangular rectangular projection graph of each partial panoramic image;

performing rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and adjusting stitching positions of the adjacent second equirectangular rectangular projection graphs according to pixel light streams in the stitching sides of adjacent second equirectangular rectangular projection graphs, and performing stitching operation on the second equirectangular rectangular projection graphs according to the adjusted stitching positions.

The embodiments of the present disclosure further provide a panoramic image stitching apparatus configured to perform stitching operation on panoramic images taken by each lens in a multi-lens panoramic camera. The apparatus includes:

a partial panoramic image acquisition module used to configure a partial panoramic image taken by each lens;

an image expansion module configured to perform equirectangular expansion on each partial panoramic image to acquire a first equirectangular rectangular projection graph of each partial panoramic image;

an image rotation module configured to perform rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and an image stitching module configured to adjust stitching positions of the adjacent second equirectangular rectangular projection graphs according to pixel light streams in the stitching sides of adjacent second equirectangular rectangular projection graphs, and perform stitching operation on the second equirectangular rectangular projection graphs according to the adjusted stitching positions.

The embodiments of the present disclosure further provide a computer-readable storage medium having a processor executable instruction stored therein. The instruction is loaded by one or more processors to execute the above panoramic image stitching method. The method includes:

acquiring a partial panoramic image taken by each lens;

performing equirectangular expansion on each partial panoramic image to acquire a first equirectangular rectangular projection graph of each partial panoramic image;

performing rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and adjusting stitching positions of the adjacent second equirectangular rectangular projection graphs according to pixel light streams in the stitching sides of adjacent second equirectangular rectangular projection graphs, and performing stitching operation on the second equirectangular rectangular projection graphs according to the adjusted stitching positions.

The embodiments of the present disclosure further provide a terminal which includes a processor and a memory. The memory stores a plurality of instructions. The processor loads the instructions from the memory to execute the above panoramic image stitching method. The method includes:

acquiring a partial panoramic image taken by each lens;

performing equirectangular expansion on each partial panoramic image to acquire a first equirectangular rectangular projection graph of each partial panoramic image;

performing rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and adjusting stitching positions of the adjacent second equirectangular rectangular projection graphs according to pixel light streams in the stitching sides of adjacent second equirectangular rectangular projection graphs, and performing stitching operation on the second equirectangular rectangular projection graphs according to the adjusted stitching positions.

According to the panoramic image stitching method and apparatus, the terminal and the corresponding storage medium of the present disclosure, the pixel light streams are used to stitch the equirectangular rectangular projection graphs having the stitching sides, so that a ghosting phenomenon in the stitched equirectangular rectangular projection graph may be well eliminated, and the technical problem that an existing panoramic image stitching method and apparatus would generate the ghosting phenomenon during stitching of panoramic images is effectively solved.

DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present invention, all other embodiments obtained by those skilled in the art without creative work shall fall within the scope of protection of the present invention.

A panoramic image stitching method and a panoramic image stitching apparatus of the present disclosure may be arranged in any electronic device to perform stitching operation on panoramic images, and may effectively eliminate a ghosting phenomenon of a stitched panoramic image (such as an equirectangular rectangular projection graph). The electronic device includes, but is not limited to, a wearable device, a head-mounted device, a medical and health platform, a personal computer, a server computer, a handheld or laptop device, a mobile device (such as a mobile phone, a personal digital assistant (PDA) and a media player), a multi-processor system, a consumer electronic device, a small computer, a large computer, a distributed computing environment including any of the above systems or devices, etc. The electronic device is preferably a panoramic camera having at least two taking lenses, so that the panoramic camera may output panoramic images without a ghosting phenomenon, and the image output quality of the panoramic images is improved.

Figure 1:
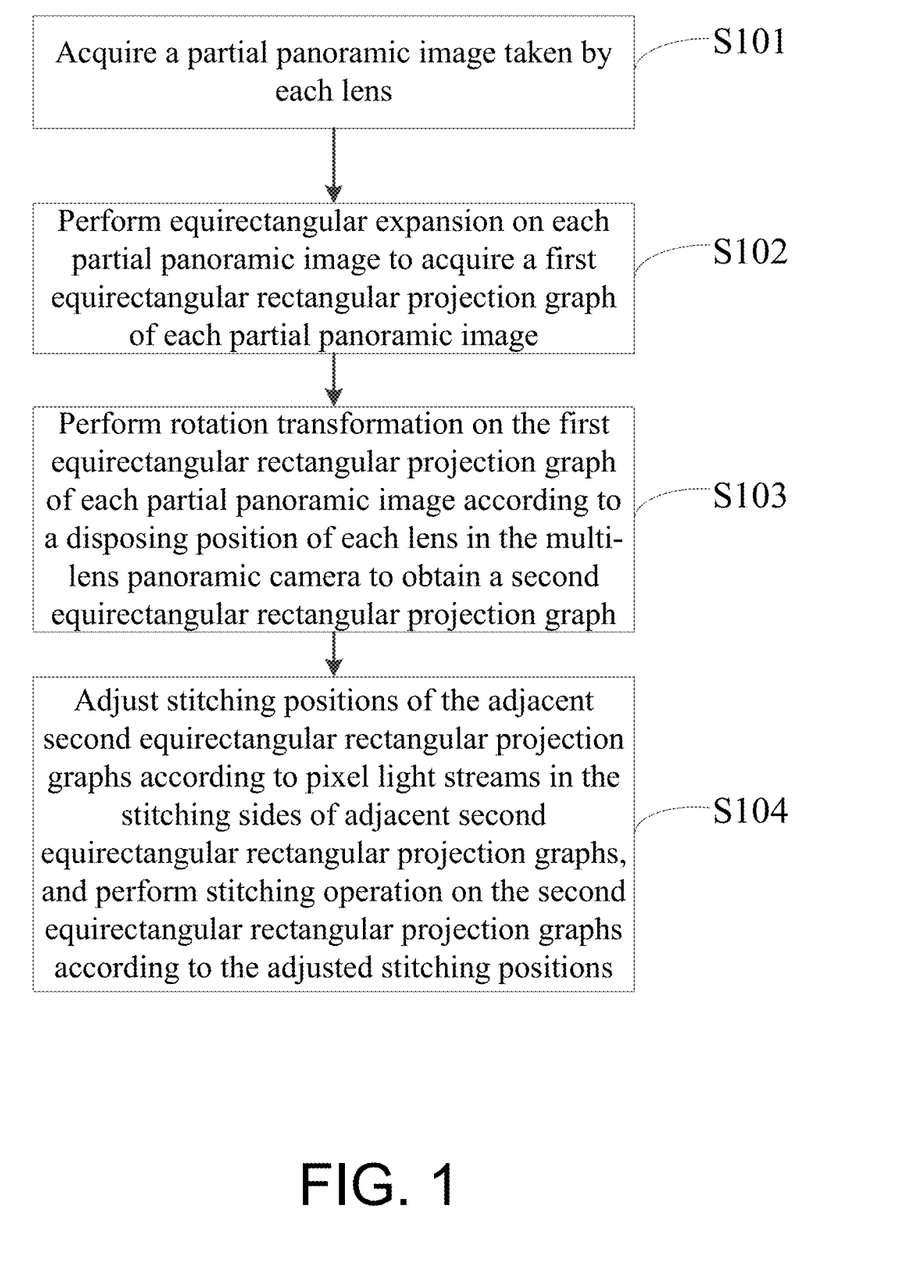
FIG. 1 is a flow diagram of an embodiment of a panoramic image stitching method of the present disclosure.

Referring to FIG. 1, FIG. 1 is a flow diagram of an embodiment of a panoramic image stitching method of the present disclosure. The panoramic image stitching method of the present embodiment may be implemented by using the foregoing electronic device. The panoramic image stitching method includes:

step S101, a partial panoramic image taken by each lens is acquired;

step S102, equirectangular expansion is performed on each partial panoramic image to acquire a first equirectangular rectangular projection graph of each partial panoramic image;

step S103, rotation transformation is performed on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and step S104, stitching positions of the adjacent second equirectangular rectangular projection graphs are adjusted according to pixel light streams in the stitching sides of adjacent second equirectangular rectangular projection graphs, and stitching operation is performed on the second equirectangular rectangular projection graphs according to the adjusted stitching positions.

A panoramic image stitching process of the panoramic image stitching method of the present embodiment is described in detail below.

In the step S101, a panoramic image stitching apparatus may be arranged in the multi-lens panoramic camera, or may be arranged in any electronic device connected to the multi-lens panoramic camera, and used for performing image stitching processing on output panoramic images of the multi-lens panoramic camera.

Figure 2:
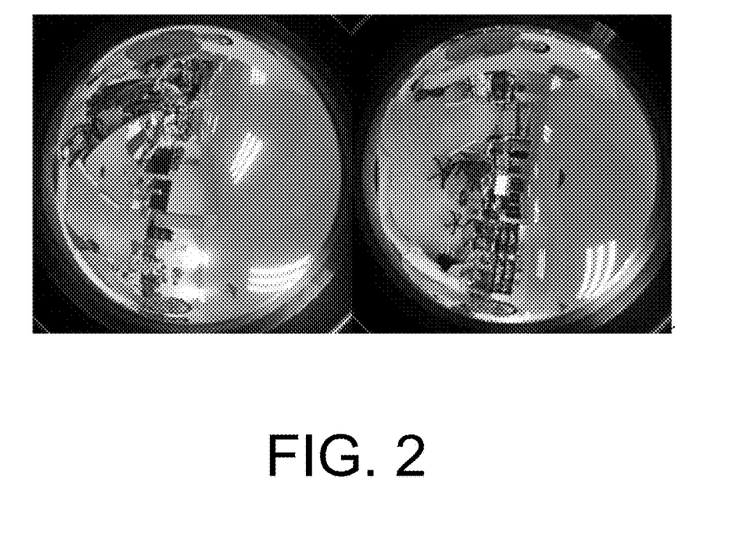
FIG. 2 is a schematic diagram of a partial panoramic image in an embodiment of a panoramic image stitching method of the present disclosure.

The panoramic image stitching apparatus acquires the partial panoramic images taken by each lens of the multi-lens panoramic camera. The taking lens here is generally a fisheye lens, and the taken partial panoramic images are consistent with the shape of the lens, which is usually circular, as shown in FIG. 2.

If the multi-lens panoramic camera is a dual-lens panoramic camera, two taking lenses may be disposed back to back, and views of the two taking lenses are greater than 180 degrees. In this way, in this step, the panoramic image stitching apparatus may acquire a circular partial panoramic image taken by each taking lens, and the contents of two partial panoramic images have an overlap part.

In the step S102, the panoramic image stitching apparatus needs to adjust the stitching positions of the overlap parts of the partial panoramic images in the process of stitching the foregoing partial panoramic images, so that superposition of the overlap parts of the stitched panoramic images will not generate a ghosting phenomenon.

Figure 3:
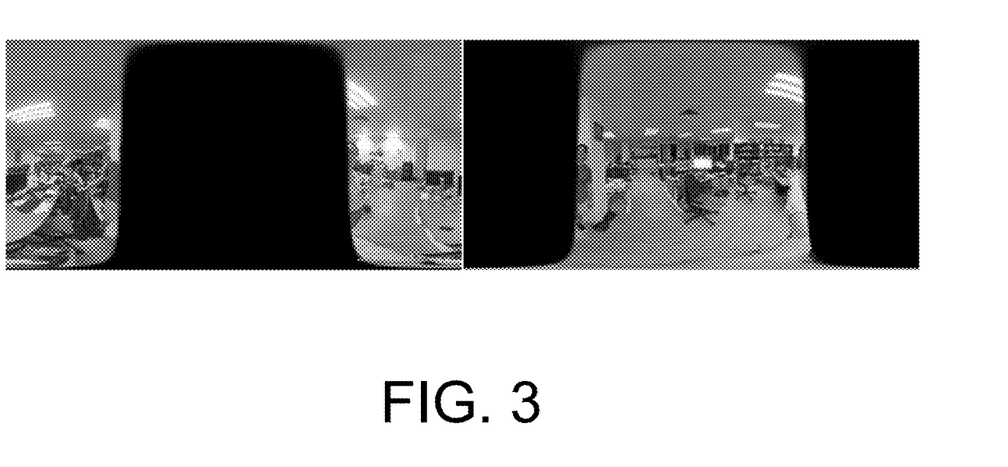
FIG. 3 is a schematic diagram of a first equirectangular rectangular projection graph in an embodiment of a panoramic image stitching method of the present disclosure.

Therefore, the panoramic image stitching apparatus performs the equirectangular expansion on each partial panoramic image acquired in the step S101 to acquire a first equirectangular rectangular projection graph of each partial panoramic image. The first equirectangular rectangular projection graph formed after each partial panoramic image in FIG. 2 is subjected to the equirectangular expansion is as shown in FIG. 3.

Figure 5:
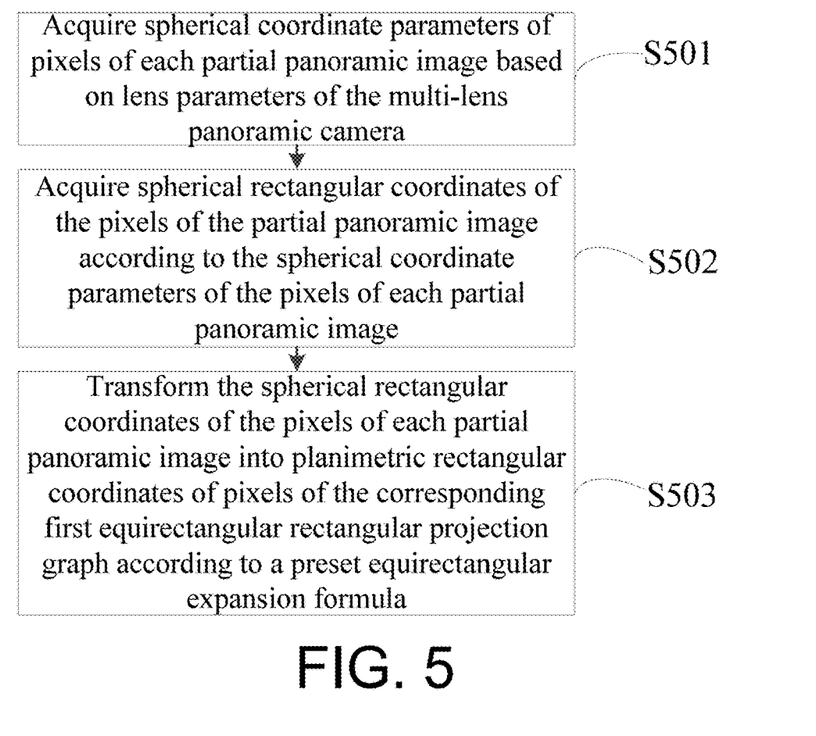
FIG. 5 is a flow diagram of the step S102 of an embodiment of a panoramic image stitching method of the present disclosure.

Specifically, referring to FIG. 5, FIG. 5 is a flow diagram of the step S102 of an embodiment of a panoramic image stitching method of the present disclosure. The step S102 includes:

step S501, spherical coordinate parameters of pixels of each partial panoramic image are acquired based on lens parameters of the multi-lens panoramic camera to perform coordinate system transformation on the pixels of the partial panoramic image. The lens parameters here include, but are not limited to, fisheye lens distortion parameters of the multi-lens panoramic camera and spherical coordinate system parameters of the corresponding partial panoramic images.

step S502, spherical rectangular coordinates of the pixels of the partial panoramic image are acquired according to the spherical coordinate parameters of the pixels of each partial panoramic image.

Specifically, spherical coordinates of the pixels of each partial panoramic image may be acquired by using the following formulas:

$x = \sin(kr) \times \sin(\alpha);$ $y = \sin(kr) \times \cos(\alpha);$ $z = \cos(kr);$ wherein r is a radial distance of the spherical coordinates of the pixels of each partial panoramic image; $\alpha$ is an azimuth angle of the spherical coordinates of each pixels of the partial panoramic image; k is a fisheye lens distortion parameter of the multi-lens panoramic camera; x is a spherical rectangular horizontal coordinate of the pixels of each partial panoramic image; y is a spherical rectangular longitudinal coordinate of the pixels of each partial panoramic image; an z is a spherical rectangular vertical coordinate of the pixels of each partial panoramic image.

In this way, the spherical rectangular coordinates (x, y, z) of the pixels of each partial panoramic images may be acquired.

step S503, the spherical rectangular coordinates of the pixels of each partial panoramic image acquired in the step S502 are transformed into planimetric rectangular coordinates of pixels of the corresponding first equirectangular rectangular projection graph according to a preset equirectangular expansion formula.

Specifically, the planimetric rectangular coordinates of the pixels of each first equirectangular rectangular projection graph may be acquired by using the following formulas:

$$u_{equi} = \mathrm{atan}\left(\frac{x}{\sqrt{x^2+z^2}}\right) * image1Width;$$

$$v_{equi} = \mathrm{atan}(y/z) * image1Height;$$

wherein x is a spherical rectangular horizontal coordinate of the pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; $u_{equi}$ is a planimetric rectangular horizontal coordinate of pixels of each first equirectangular rectangular projection graph; and $v_{equi}$ is a planimetric rectangular longitudinal coordinate of the pixels of each first equirectangular rectangular projection graph.

In this way, the planimetric rectangular coordinates ($u_{equi}$, $v_{equi}$) of the pixels of each first equirectangular rectangular projection graph may be acquired.

In the step S103, each first equirectangular rectangular projection graph has a plurality of stitching sides, overlap regions of the stitching sides are distributed in a non-uniform manner, and an upper edge and a lower edge which are close to each first equirectangular rectangular projection graph have apparent swelling, so that in this step, the panoramic image stitching apparatus performs rotation transformation on the first equirectangular rectangular projection graph of each partial panoramic image according to the disposing position of each lens in the multi-lens panoramic camera to obtain the second equirectangular rectangular projection graph.

Figure 4:
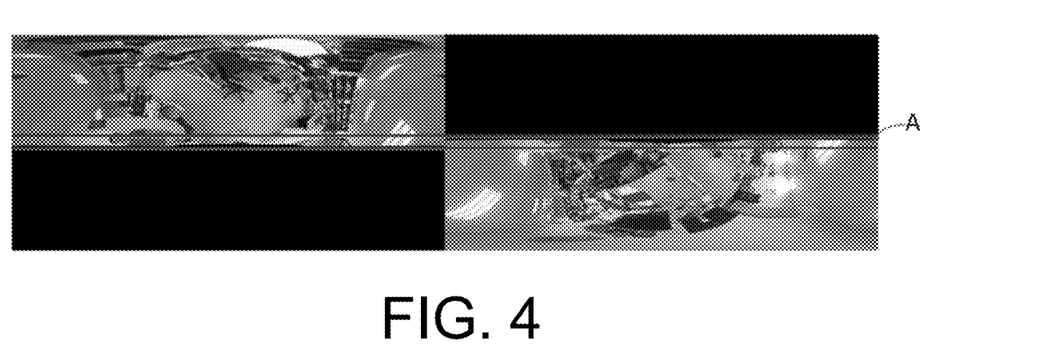
FIG. 4 is a schematic diagram of a second equirectangular rectangular projection graph in an embodiment of a panoramic image stitching method of the present disclosure.

The stitching band of each transformed second equirectangular rectangular projection graph is located on the stitching side of the second equirectangular rectangular projection graph, and each second equirectangular rectangular projection graph only has one stitching side. In this way, when stitching operation is performed on adjacent second equirectangular rectangular projection graphs, stitching position adjustment for the partial panoramic images (or the second equirectangular rectangular projection graphs) may be realized by only considering pixel light streams in the stitching sides of the adjacent second equirectangular rectangular projection graphs. The second equirectangular rectangular projection graph obtained after each first equirectangular rectangular projection graph in FIG. 3 is subjected to the rotation transformation is as shown in FIG. 4. The region A of FIG. 4 is a stitching band region of each transformed second equirectangular rectangular projection graph.

Specifically, planimetric rectangular coordinates of pixels of each second equirectangular rectangular projection graph may be acquired by using the following formulas:

$$u_{equi} = \operatorname{atan}\left(\frac{x}{\sqrt{x^2 + z^2}}\right) * image1Width;$$

$$v_{equi} = \operatorname{atan}(y/z) * image1Height;$$

$$p(x, y, z) = P;$$

$$R = \begin{bmatrix} 1 & 0 & 0 \\ 0 & 0 & -1 \\ 0 & 1 & 0 \end{bmatrix};$$

$$p_{flow-equi}(x_{flow-equi}, y_{flow-equi}, z_{flow-equi}) = R \cdot P;$$

$$u_{flow-equi} = \operatorname{atan}\left(\frac{x_{flow-equi}}{\sqrt{x_{flow-equi}^2 + z_{flow-equi}^2}}\right) * image2Width;$$

$$v_{flow-equi} = \operatorname{atan}(y_{flow-equi}/z_{flow-equi}) * image2Height;$$

wherein x is the spherical rectangular horizontal coordinate of pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; image2Width is an image width of each second equirectangular rectangular projection graph; image2Height is a height of each second equirectangular rectangular projection graph; $u_{equi}$ is a planimetric rectangular horizontal coordinate of pixels of each first equirectangular rectangular projection graph; $v_{equi}$ is a planimetric rectangular longitudinal coordinate of the pixels of each first equirectangular rectangular projection graph; $u_{flow-equi}$ is a planimetric rectangular horizontal coordinate of pixels of each second equirectangular rectangular projection graph; $v_{flow-equi}$ is a planimetric rectangular longitudinal coordinate of the pixels of each second equirectangular rectangular projection graph.

In this way, the planimetric rectangular coordinates ($u_{flow-equi}$, $v_{flow-equi}$) of the pixels of each second equirectangular rectangular projection graph may be acquired.

In the step S104, the panoramic image stitching apparatus adjusts the stitching positions of the adjacent second equirectangular rectangular projection graphs according to the pixel light streams in the stitching sides of the adjacent second equirectangular rectangular projection graphs acquired in the step S103, and performs the stitching operation on the second equirectangular rectangular projection graphs according to the adjusted stitching positions.

Figure 6A:
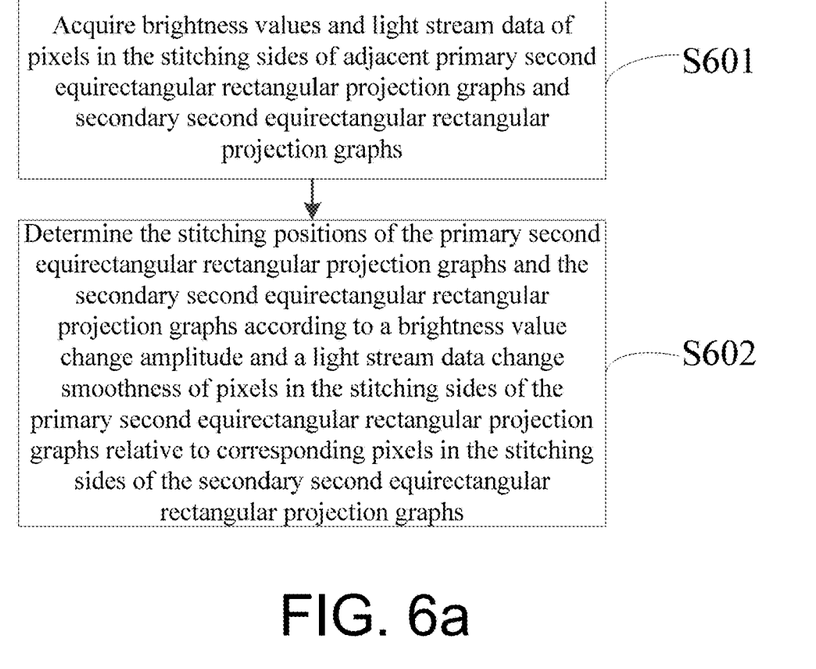
FIG. 6a is a flow diagram of the step S104 of an embodiment of a panoramic image stitching method of the present disclosure.

Specifically, referring to FIG. 6a, FIG. 6a is a flow diagram of the step S104 of an embodiment of a panoramic image stitching method of the present disclosure. The step S104 includes:

step S601, the panoramic image stitching apparatus acquires brightness values and light stream data of the pixels in the stitching sides of adjacent primary second equirectangular rectangular projection graphs and secondary second equirectangular rectangular projection graphs; and step S602, the panoramic image stitching apparatus determines the stitching positions of the primary second equirectangular rectangular projection graphs and the secondary second equirectangular rectangular projection graphs according to a brightness value change amplitude and a light stream data change smoothness of pixels in the stitching sides of the primary second equirectangular rectangular projection graphs relative to corresponding pixels in the stitching sides of the secondary second equirectangular rectangular projection graphs.

Specifically, the stitching positions of the primary second equirectangular rectangular projection graphs and the secondary second equirectangular rectangular projection graphs may be determined by the following formula;

$$\operatorname*{argmin}_{(\Delta x, \Delta y)_{i,j}} \sum_{(i,j)} \|I_2(i,j) - I_2(i+\Delta x_{i,j}, j+\Delta y_{i,j})\|_2 + \omega \sum_{(i,j)} \sum_{(u,v) \in N(i,j)} \|(\Delta x, \Delta y)_{i,j} - (\Delta x, \Delta y)_{u,v}\|_2$$

where $I_2(i,j)$ is a brightness value of a pixel at a coordinate (i,j) of each secondary second equirectangular rectangular projection graph; $I_1(i+\Delta x_{i,j}, j+\Delta y_{i,j})$ is a brightness value of a pixel at a coordinate $(i+\Delta x_{i,j}, j+\Delta y_{i,j})$ of each primary second equirectangular rectangular projection graph; $\Delta x_{i,j}$ is x-axis light stream data of a pixel at a coordinate (i,j) of each primary second equirectangular rectangular projection graph; $\Delta y_{i,j}$ is y-axis light stream data of the pixel at the coordinate (i,j) of each primary second equirectangular rectangular projection graph; $\Delta x_{u,v}$ is x-axis light stream data of a pixel at a coordinate (u,v) of each secondary second equirectangular rectangular projection graph; $\Delta y_{u,v}$ is y-axis light stream data of the pixel at the coordinate (u,v) of each secondary second equirectangular rectangular projection graph; and ω is a smoothness constant.

The first item in this formula is a data item. The brightness value of each pixel on the stitching sides of the primary second equirectangular rectangular projection graphs that deviate ($\Delta x_{i,j}$, $\Delta y_{i,j}$) is compared with the brightness value of the corresponding pixel on the stitching sides of the secondary second equirectangular rectangular projection graphs. A difference between the brightness value of each pixel on the stitching sides of the primary second equirectangular rectangular projection graphs and the brightness value of the corresponding pixel on the stitching sides of the secondary second equirectangular rectangular projection graphs is caused to be as small as possible by selecting one stitching position of the primary second equirectangular rectangular projection graphs and the secondary second equirectangular rectangular projection graphs.

The second item in this formula is a smoothness item to ensure that a light stream data variation between each pixel on the stitching sides of the primary second equirectangular rectangular projection graphs that deviate ($\Delta x_{i,j}$, $\Delta y_{i,j}$) and the corresponding pixel on the stitching sides of the secondary second equirectangular rectangular projection graphs is as small as possible.

Figure 6B:
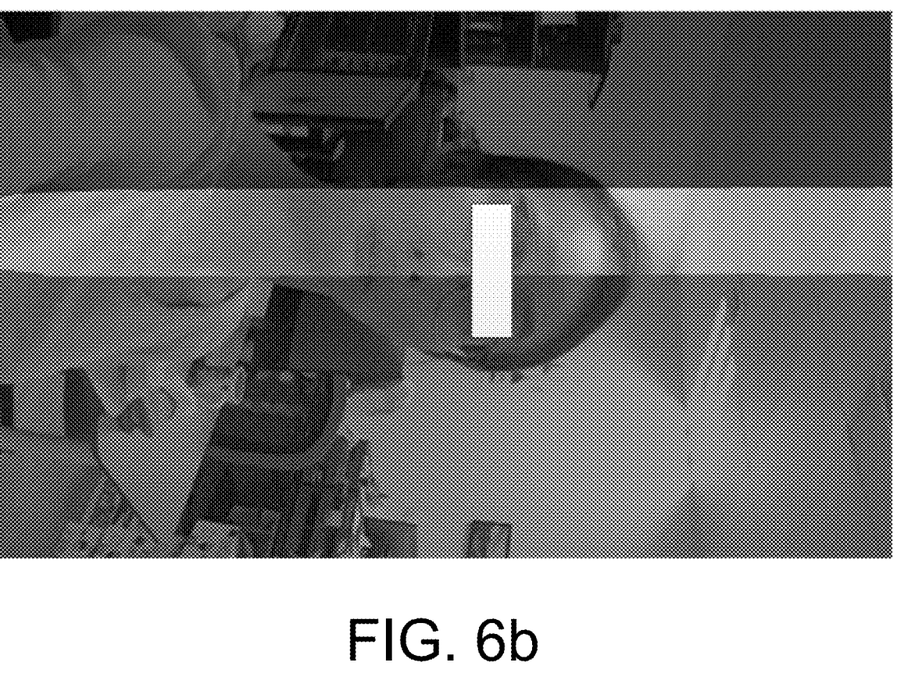
FIG. 6b is a schematic diagram of an effect of directly performing stitching operation on adjacent second equirectangular rectangular projection graphs without performing stitching position adjustment.
Figure 6C:
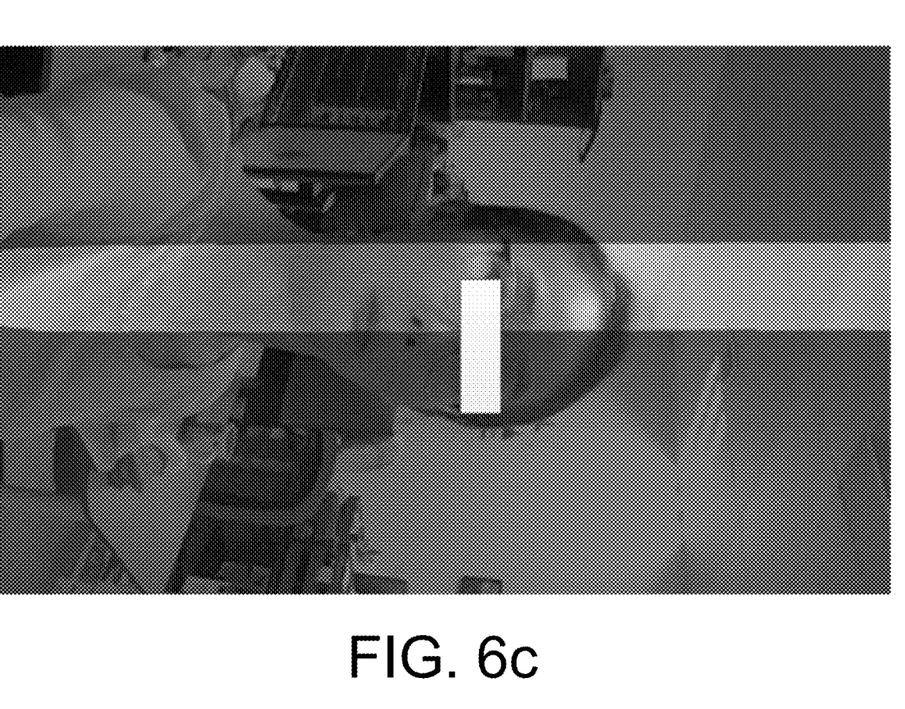
FIG. 6c is a schematic diagram of an effect of performing stitching operation on adjacent second equirectangular rectangular projection graphs after stitching position adjustment is performed.

This formula acquires stitching points $(i+\Delta x_{i,j}, j+\Delta y_{i,j})$ of the pixels of each primary second equirectangular rectangular projection graph that meets the above-mentioned stitching conditions are acquired by the light stream data ($\Delta x_{i,j}$, $\Delta y_{i,j}$) of each pixel on the stitching sides of the primary second equirectangular rectangular projection graphs, and then stitching operation is performed on the stitching points $(i+\Delta x_{i,j}, j+\Delta y_{i,j})$ of the pixels of the primary second equirectangular rectangular projection graphs and the stitching points (i,j) of the pixels of the secondary second equirectangular rectangular projection graphs to complete the stitching position adjustment of the primary second equirectangular rectangular projection graphs relative to the secondary second equirectangular rectangular projection graphs. A specific stitching operation effect refers to FIG. 6b and FIG. 6c. FIG. 6b is a schematic diagram of an effect of directly performing stitching operation on adjacent second equirectangular rectangular projection graphs without performing stitching position adjustment, and FIG. 6c is a schematic diagram of an effect of performing stitching operation on adjacent second equirectangular rectangular projection graphs after stitching position adjustment is performed. It is apparent that the glasses part of a character in FIG. 6b has a ghosting phenomenon, and the eye part of a character in FIG. 6c has eliminated the ghosting phenomenon.

Finally, the panoramic image stitching apparatus performs the stitching operation on the second equirectangular rectangular projection graphs according to the adjusted stitching positions.

The second equirectangular rectangular projection graphs are stitched only in accordance with the pixel light streams of the stitching sides of the second equirectangular rectangular projection graphs, so that the difficulty the whole stitching operation is simplified, and the image quality of the stitched second equirectangular rectangular projection graphs is guaranteed, thus guaranteeing the image quality of a stitched panoramic image.

The panoramic image stitching process of the panoramic image stitching method of the present embodiment is completed in this way.

The panoramic image stitching method of the present embodiment uses the pixel light streams to stitch the equirectangular rectangular projection graphs having the stitching sides, so that the ghosting phenomenon of the stitched equirectangular rectangular projection graph may be well eliminated.

When the panoramic image stitching method of the present disclosure is used to perform image stitching on panoramic video images, if calculation of stitching positions of each panoramic image frame may be completed within the time of one frame of image, real-time image stitching and image outputting of the panoramic video images may be realized. If the stitching operation time of performing the stitching operation on one panoramic image frame is longer than the display time of one panoramic image frame, the image stitching and real-time outputting processes for the panoramic video images need to be carried out through the following steps.

Figure 7:
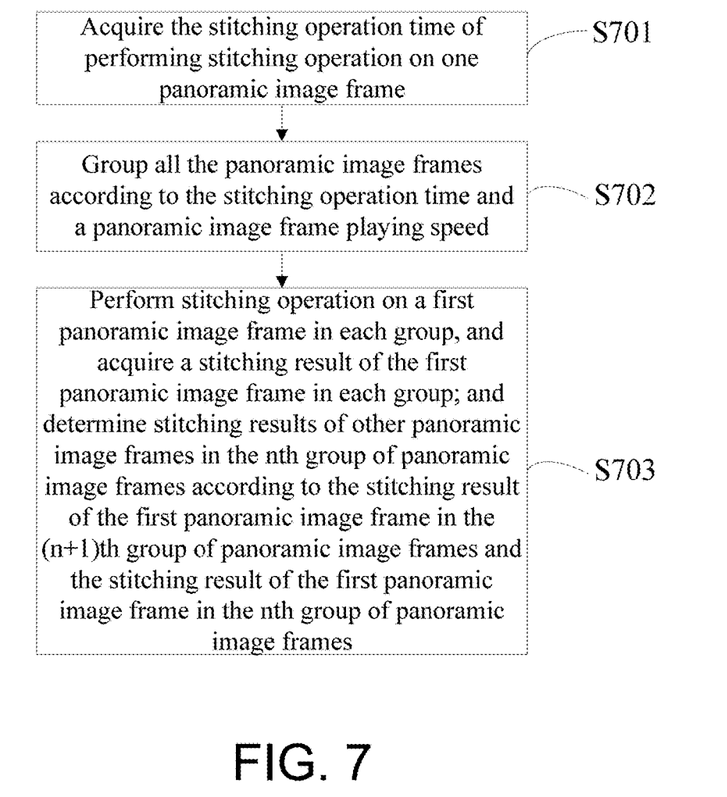
FIG. 7 is a flow diagram of image stitching for panoramic video images of an embodiment of a panoramic image stitching method of the present disclosure.

Referring to FIG. 7, FIG. 7 is a flow diagram of image stitching for panoramic video images of an embodiment of a panoramic image stitching method of the present disclosure. When the panoramic image stitching apparatus of the present disclosure is used to stitch the panoramic video images, the panoramic image stitching method includes:

step S701, the panoramic image stitching apparatus acquires the stitching operation time of performing stitching operation on one panoramic image frame. The stitching operation time should be much longer than the display time of one panoramic image frame.

Step S702, the panoramic image stitching apparatus groups all the panoramic image frames according to the stitching operation time acquired in the step S701 and a panoramic image frame playing speed. If the time of each stitching operation is equal to the display time of n panoramic image frames, only one panoramic image frame may be stitched for every n panoramic image frames. All the panoramic image frames are grouped here according to the time points when the stitching operation is performed on the panoramic image frames. That is, only one panoramic image frame in each group of panoramic image frames is subjected to the stitching operation.

Step S703, the panoramic image stitching apparatus performs stitching operation on a first panoramic image frame in each group acquired in the step S702, and acquires a stitching result of the first panoramic image frame in each group.

Later, the panoramic image stitching apparatus determines stitching results of other panoramic image frames in the nth group of panoramic image frames according to the stitching result of the first panoramic image frame in the (n+1)th group of panoramic image frames and the stitching result of the first panoramic image frame in the nth group of panoramic image frames, i.e., determines the stitching results of other panoramic image frames between the two first panoramic image frames through two adjacent first panoramic image frames.

Specifically, the panoramic image stitching apparatus here may use a difference algorithm to determine the stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

In this way, the image stitching and real-time outputting processes of the panoramic video images may be realized as long as the panoramic image frames are displayed in a delayed manner to a certain extent.

The panoramic image stitching method of the present embodiment may well eliminate the ghosting phenomenon in the panoramic video images by means of delayed displaying and prediction of the stitching results, and can realize image stitching and real-time outputting of the panoramic video images.

Figure 8:
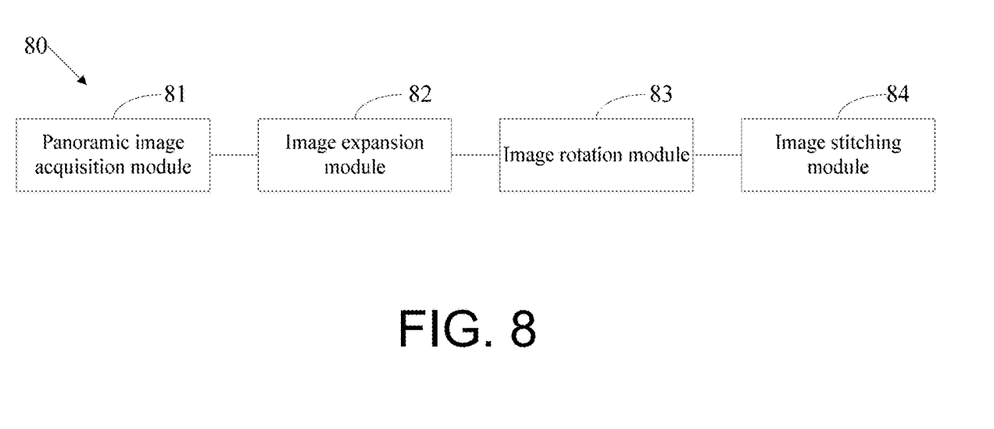
FIG. 8 is a schematic structural diagram of an embodiment of a panoramic image stitching apparatus of the present disclosure.

The present disclosure further provides a panoramic image stitching apparatus. Referring to FIG. 8, FIG. 8 is a schematic structural diagram of an embodiment of a panoramic image stitching apparatus of the present disclosure. The panoramic image stitching apparatus of the present embodiment may be implemented by using the aforementioned panoramic image stitching method. The panoramic image stitching apparatus 80 of the present embodiment includes a partial panoramic image acquisition module 81, an image expansion module 82, an image rotation module 83 and an image stitching module 84.

The partial panoramic image acquisition module 81 is configured to acquire a partial panoramic image taken by each lens; the image expansion module 82 is configured to perform equirectangular expansion on each partial panoramic image to acquire a first equirectangular rectangular projection graph of each partial panoramic image; the image rotation module 83 is configured to perform rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph; and the image stitching module 84 is configured to adjust stitching positions of the adjacent second equirectangular rectangular projection graphs according to pixel light streams in the stitching sides of adjacent second equirectangular rectangular projection graphs, and perform stitching operation on the second equirectangular rectangular projection graphs according to the adjusted stitching positions.

When the panoramic image stitching apparatus 80 of the present embodiment is used, firstly, the partial panoramic image acquisition module 81 acquires the partial panoramic images taken by each lens of the multi-lens panoramic camera. The taking lens here is generally a fisheye lens, and the taken partial panoramic images are consistent with the shape of the lens, which is usually circular, as shown in FIG. 2.

Later, the image expansion module 82 performs the equirectangular expansion on each partial panoramic image acquired by the partial panoramic image acquisition module 81 to acquire the first equirectangular rectangular projection graph of each partial panoramic image. The first equirectangular rectangular projection graph formed after each partial panoramic image in FIG. 2 is subjected to the equirectangular expansion is as shown in FIG. 3.

Then, the image rotation module 83 performs rotation transformation on the first equirectangular rectangular projection graph of each partial panoramic image according to the disposing position of each lens in the multi-lens panoramic camera to obtain the second equirectangular rectangular projection graph.

The stitching band of each transformed second equirectangular rectangular projection graph is located on the stitching side of the second equirectangular rectangular projection graph, and each second equirectangular rectangular projection graph only has one stitching side. In this way, when stitching operation is performed on adjacent second equirectangular rectangular projection graphs, stitching position adjustment for the partial panoramic images (or the second equirectangular rectangular projection graphs) may be realized by only considering pixel light streams in the stitching sides of the adjacent second equirectangular rectangular projection graphs. The second equirectangular rectangular projection graph obtained after each first equirectangular rectangular projection graph in FIG. 3 is subjected to the rotation transformation is as shown in FIG. 4. The region A of FIG. 4 is a stitching band region of each transformed second equirectangular rectangular projection graph.

Finally, the image stitching module 84 adjusts the stitching positions of the adjacent second equirectangular rectangular projection graphs according to the pixel light streams in the stitching sides of the adjacent second equirectangular rectangular projection graphs acquired by the image rotation module 83, and performs the stitching operation on the second equirectangular rectangular projection graphs according to the adjusted stitching positions.

The panoramic image stitching process of the panoramic image stitching apparatus 80 of the present embodiment is completed in this way.

The specific working principle of the panoramic image stitching apparatus of the present embodiment is the same as or similar to the descriptions in the embodiments of the aforementioned panoramic image stitching method, specifically referring to the related descriptions in the embodiments of the aforementioned panoramic image stitching method.

The panoramic image stitching method and apparatus of the present disclosure use the pixel light streams to stitch the equirectangular rectangular projection graphs having the stitching sides, so that the ghosting phenomenon in the stitched equirectangular rectangular projection graph may be well eliminated, and the technical problem that an existing panoramic image stitching method and apparatus would generate the ghosting phenomenon during stitching of panoramic images is effectively solved.

Terms such as "component", "module", "system", "interface" and "process" used in the present application generally refer to computer-relevant entities: hardware, a combination of hardware and software, software or software being executed. For example, the component can be, but not limited to a process running on a processor, the processor, an object, an executable application, an executed thread, a program and/or a computer. Shown by the drawings, an application running on a controller and the controller can be both components. One or more components can exist in the executed process and/or thread and can be located on one computer and/or distributed between two computers or among more computers.

Figure 9:
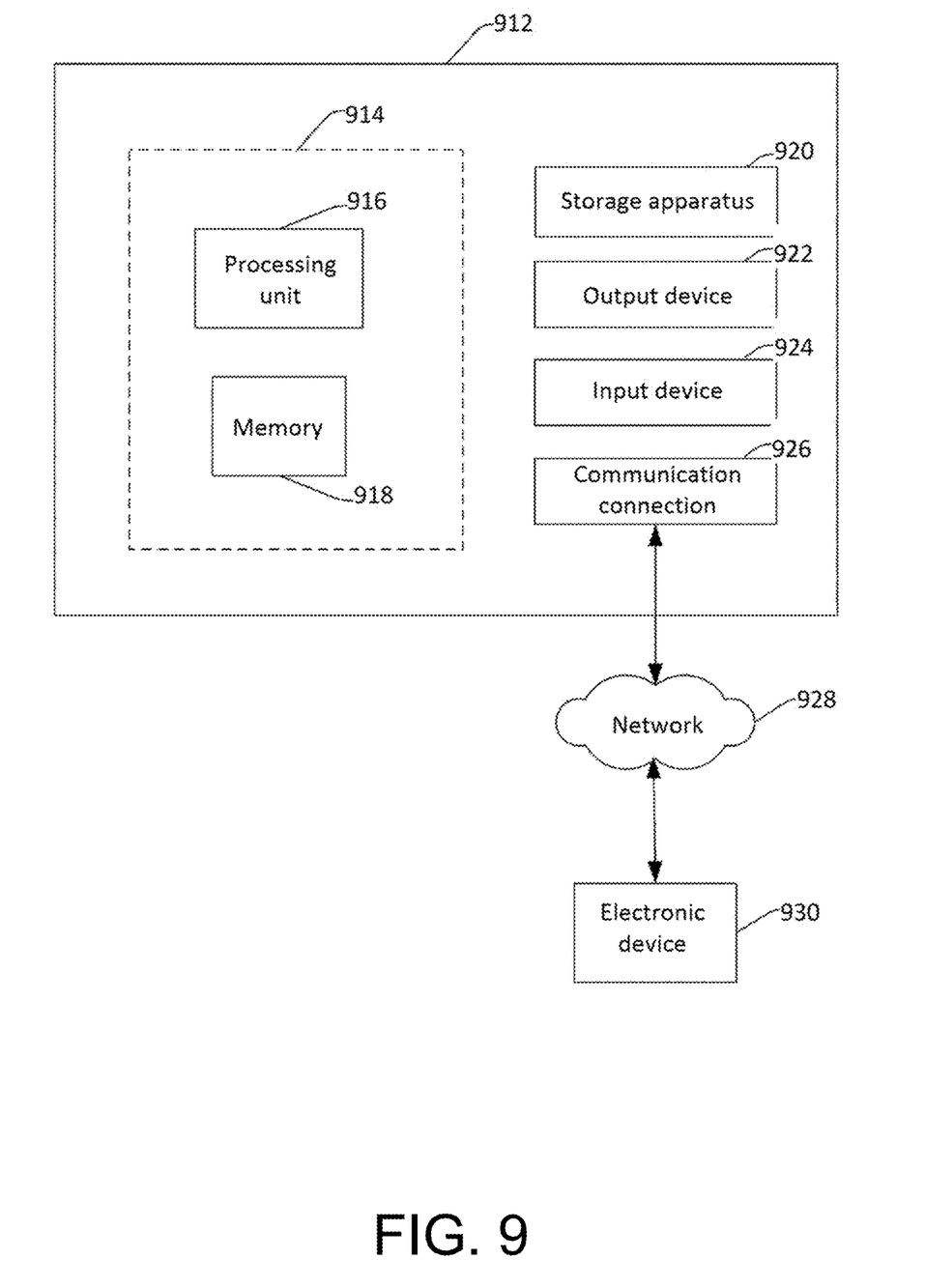
FIG. 9 is a schematic diagram showing a structure of a working environment of an electronic device where the panoramic image stitching apparatus provided by the present invention is located.

FIG. 9 and the subsequent discussion provide brief and general descriptions for a working environment of an electronic device where the panoramic image stitching apparatus provided by the present invention is located. The working environment shown in FIG. 9 is only an example of an appropriate working environment and is not intended to constitute any limitations on the range of applications or functions of the working environment. An exemplary electronic device 912 comprises, but is not limited to, a wearable device, a head-mounted device, a medical health platform, a personal computer, a server computer, a handheld or laptop device, a mobile device (such as a mobile phone, a personal digital assistant (PDA) and a media player), a multi-processor system, a consumer electronic device, a small-size computer, a large-scale computer, and a distributed computing environment comprising any of above-mentioned systems or devices.

Although not required, the embodiment is described under the general background that "computer readable instructions" are executed by one or more electronic devices. The computer readable instructions can be distributed by a computer readable medium (discussed below). The computer readable instructions are implemented as program modules such as functions, objects, application programming interfaces (API) and data structures for executing specific tasks or implementing specific abstract data types. Typically, the functions of the computer readable instructions can be randomly combined or distributed in various environments.

FIG. 9 illustrates an example of an electronic device 912 comprising one or more embodiments of the panoramic image stitching apparatus provided by the present invention. In one configuration, the electronic device 912 comprises at least one processing unit 916 and a memory 918. According to the exact configuration and type of the electronic device, the memory 918 can be a volatile memory (such as an RAM), a non-volatile memory (such as an ROM and a flash memory) or a certain combination of the volatile memory and the non-volatile memory. The configuration is shown as a dotted line 914 in FIG. 9.

In other embodiments, the electronic device 912 can comprise additional features and/or functions. For example, the device 912 can further comprise an additional storage apparatus (for example, removable and/or non-removable), and comprises, but is not limited to, a magnetic storage apparatus and an optical storage apparatus. The additional storage apparatus is illustrated as a storage apparatus 920 in FIG. 9. In one embodiment, the computer readable instructions for implementing one or more embodiments provided herein can be stored in the storage apparatus 920. The storage apparatus 920 can further store other computer readable instructions for implementing an operating system and an application. The computer readable instructions can be loaded into the memory 918 so as to be executed by, for example, the processing unit 916.

The term "computer readable medium" used herein comprises a computer storage medium. The computer storage medium comprises a volatile medium, a non-volatile medium, a removable medium and a non-removable medium implemented by using any method or technology for storing information such as the computer readable instructions or other data. The memory 918 and the storage apparatus 920 are examples of the computer storage medium. The computer storage medium comprises, but is not limited to, an RAM, an ROM, an EEPROM, a flash memory or other memory technologies, a CD-ROM, a digital video disk (DVD) or other optical storage apparatuses, a cassette tape, a magnetic tape, a magnetic disk storage apparatus or other magnetic storage devices, or any other media which can be used for storing desired information and can be accessed by the electronic device 912. Any of such computer storage media can be a part of the electronic device 912.

The electronic device 912 can further comprise a communication connection 926 allowing the electronic device 912 to communicate with other devices. The communication connection 926 can comprise, but not limited to, a modem, a network interface card (NIC), an integrated network interface, a radio frequency transmitter/receiver, an infrared port, a USB connection or other interfaces for connecting the electronic device 912 to other electronic devices. The communication connection 926 can comprise wired connection or wireless connection. The communication connection 926 is capable of transmitting and/or receiving a communication medium.

The term "computer readable medium" can comprise a communication medium. The communication medium typically comprises computer readable instructions or other data in "modulated data signals" such as carriers or other transmission mechanisms, and comprises any information delivery medium. The term "modulated data signals" can comprise such signals that one or more of signal features are set or changed in a manner of encoding information into the signals.

The electronic device 912 can comprise an input device 924 such as a keyboard, a mouse, a pen, a voice input device, a touch input device, an infrared camera, a video input device and/or any other input devices. The device 912 can further comprise an output device 922 such as one or more displays, loudspeakers, printers and/or any other output devices. The input device 924 and the output device 922 can be connected to the electronic device 912 by wired connection, wireless connection or any combination thereof. In one embodiment, an input device or an output device of another electronic device can be used as the input device 924 or the output device 922 of the electronic device 912.

Components of the electronic device 912 can be connected by various interconnections (such as a bus). Such interconnections can comprise a peripheral component interconnect (PCI) (such as a quick PCI), a universal serial bus (USB), a fire wire (IEEE 1394), an optical bus structure and the like. In another embodiment, the components of the electronic device 912 can be interconnected by a network. For example, the memory 918 can be composed of a plurality of physical memory units located on different physical positions and interconnected by the network.

It will be appreciated by those skilled in the art that storage devices for storing the computer readable instructions can be distributed across the network. For example, an electronic device 930 which can be accessed by a network 928 is capable of storing computer readable instructions for implementing one or more embodiments provided by the present invention. The electronic device 912 is capable of accessing the electronic device 930 and downloading a part or all of the computer readable instructions to be executed. Alternatively, the electronic device 912 is capable of downloading a plurality of computer readable instructions as required, or some instructions can be executed on the electronic device 912, and some instructions can be executed on the electronic device 930.

Various operations in the embodiments are provided herein. In one embodiment, the one or more operations can constitute one or more computer readable instructions stored in the computer readable medium, and a computing device will be enabled to execute the operations when the computer readable instructions are executed by the electronic device. The order of describing some or all of the operations should not be construed as implying that these operations have to be relevant to the order, and will be understood, by those skilled in the art, as an alternative order having benefits of this description. Moreover, it should be understood that not all the operations have to exist in each embodiment provided herein.

Moreover, although the present disclosure has been shown and described relative to one or more implementation modes, those skill in the art will envision equivalent variations and modifications based on reading and understanding of this description and the accompanying drawings. All of such modifications and variations are included in the present disclosure and are only limited by the scope of the appended claims. Particularly, with respect to various functions executed by the above-mentioned components (such as elements and resources), terms for describing such components are intended to correspond to any component (unless other indicated) for executing specified functions of the components (for example, the components are functionally equivalent), even if the structures of the components are different from the disclosed structures for executing the functions in an exemplary implementation mode of the present disclosure shown herein. In addition, although a specific feature in the present disclosure has been disclosed relative to only one in several implementation modes, the feature can be combined with one or more other features in other implementation modes which can be desired and beneficial for a given or specific application. Moreover, as for terms "comprising", "having" and "containing" or variants thereof applied to the detailed description or claims, such terms means inclusion in a manner similar to the term "including".

All the functional units in the embodiments of the present invention can be integrated in a processing module, or each unit separately and physically exists, or two or more units are integrated in a module. The above-mentioned integrated module can be achieved in a form of either hardware or a software functional module. If the integrated module is achieved in the form of the software functional module and is sold or used as an independent product, the integrated module can also be stored in a computer readable storage medium. The above-mentioned storage medium can be a read-only memory, a magnetic disk or an optical disk and the like. All of the above-mentioned apparatuses and systems can execute the methods in the corresponding embodiments of the methods.

In conclusion, although the present invention has been disclosed as above with the embodiments, serial numbers in front of the embodiments are merely used to facilitate description, rather than limit the order of the embodiments. Moreover, the above-mentioned embodiments are not intended to limit the present invention. Various changes and modifications can be made by those of ordinary skill in the art without departing from the spirit and scope of the present invention, and therefore, the protective scope of the present invention is subject to the scope defined by the claims.

What is claimed is:

1. A panoramic image stitching method used to perform stitching operation on panoramic images taken by each lens in a multi-lens panoramic camera, wherein the panoramic image stitching method comprises the following steps:

acquiring a partial panoramic image taken by each lens;

performing equirectangular expansion on each partial panoramic image to acquire a first equirectangular rectangular projection graph of each partial panoramic image;

performing rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph;

adjusting stitching positions of the adjacent second equirectangular rectangular projection graphs according to pixel light streams in the stitching sides of adjacent second equirectangular rectangular projection graphs, and performing stitching operation on the second equirectangular rectangular projection graphs according to the adjusted stitching positions;

acquiring the stitching operation time of performing stitching operation on one panoramic image frame;

grouping all the panoramic image frames according to the stitching operation time and a panoramic image frame playing speed; and performing stitching operation on a first panoramic image frame in each group, and acquiring a stitching result of the first panoramic image frame in each group; and determining stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

2. The panoramic image stitching method according to claim 1, wherein the step of performing equirectangular expansion on each partial panoramic image to acquire the first equirectangular rectangular projection graph of each partial panoramic image comprises:

acquiring spherical coordinate parameters of pixels of each partial panoramic image based on lens parameters of the multi-lens panoramic camera;

acquiring spherical rectangular coordinates of the pixels of the partial panoramic image according to the spherical coordinate parameters of the pixels of each partial panoramic image; and transforming the spherical rectangular coordinates of the pixels of each partial panoramic image into planimetric rectangular coordinates of pixels of the corresponding first equirectangular rectangular projection graph according to a preset equirectangular expansion formula.

3. The panoramic image stitching method according to claim 2, wherein the step of acquiring the spherical rectangular coordinates of the pixels of the partial panoramic image according to the spherical coordinate parameters of the pixels of each partial panoramic image, which are acquired based on the lens parameters of the multi-lens panoramic camera, comprises:

acquiring spherical coordinates of the pixels of each partial panoramic image by using the following formulas:

$$x = \sin(kr) \times \sin(\alpha);$$

$$y = \sin(kr) \times \cos(\alpha);$$

$$z = \cos(kr);$$

wherein r is a radial distance of the spherical coordinates of the pixels of each partial panoramic image; $\alpha$ is an azimuth angle of the spherical coordinates of the pixels of each partial panoramic image; k is a fisheye lens distortion parameter of the multi-lens panoramic camera; x is a spherical rectangular horizontal coordinate of the pixels of each partial panoramic image; y is a spherical rectangular longitudinal coordinate of the pixels of each partial panoramic image; and z is a spherical rectangular vertical coordinate of the pixels of each partial panoramic image.

4. The panoramic image stitching method according to claim 2, wherein the each partial panoramic image is taken by the each lens of the multi-lens panoramic camera, and the step of transforming the spherical rectangular coordinates of the pixels of each partial panoramic image into the planimetric rectangular coordinates of the pixels of the corresponding first equirectangular rectangular projection graph according to the preset equirectangular expansion formula comprises:

acquiring the planimetric rectangular coordinates of the pixels of each first equirectangular rectangular projection graph by using the following formulas:

$$u_{equi} = \mathrm{atan}\left(\frac{x}{\sqrt{x^2+z^2}}\right) * image1Width;$$

$$v_{equi} = \mathrm{atan}(y/z) * image1Height;$$

wherein x is a spherical rectangular horizontal coordinate of the pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; $u_{equi}$ is a planimetric rectangular horizontal coordinate of pixels of each first equirectangular rectangular projection graph; and $v_{equi}$ is a planimetric rectangular longitudinal coordinate of the pixels of each first equirectangular rectangular projection graph.

5. The panoramic image stitching method according to claim 1, wherein the step of performing rotation transformation on the first equirectangular rectangular projection graph of each partial panoramic image according to the disposing position of each lens in the multi-lens panoramic camera to obtain the second equirectangular rectangular projection graph comprises:

$$u_{equi} = \operatorname{atan}\left(\frac{x}{\sqrt{x^2 + z^2}}\right) * image1Width;$$

$$v_{equi} = \operatorname{atan}(y/z) * image1Height;$$

$$p(x, y, z) = P;$$

$$R = \begin{bmatrix} 1 & 0 & 0 \\ 0 & 0 & -1 \\ 0 & 1 & 0 \end{bmatrix};$$

$$p_{flow-equi}(x_{flow-equi}, y_{flow-equi}, z_{flow-equi}) = R \cdot P;$$

$$u_{flow-equi} = \operatorname{atan}\left(\frac{x_{flow-equi}}{\sqrt{x_{flow-equi}^2 + z_{flow-equi}^2}}\right) * image2Width;$$

$$v_{flow-equi} = \operatorname{atan}(y_{flow-equi}/z_{flow-equi}) * image2Height$$

wherein x is a spherical rectangular horizontal coordinate of pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; image2Width is an image width of each second equirectangular rectangular projection graph; image2Height is a height of each second equirectangular rectangular projection graph; $u_{equi}$ is a planimetric rectangular horizontal coordinate of pixels of each first equirectangular rectangular projection graph; $v_{equi}$ is a planimetric rectangular longitudinal coordinate of the pixels of each first equirectangular rectangular projection graph; $u_{flow-equi}$ is a planimetric rectangular horizontal coordinate of pixels of each second equirectangular rectangular projection graph; $v_{flow-equi}$ is a planimetric rectangular longitudinal coordinate of the pixels of each second equirectangular rectangular projection graph.

6. The panoramic image stitching method according to claim 1, wherein the step of adjusting the stitching positions of the adjacent second equirectangular rectangular projection graphs according to the pixel light streams in the stitching sides of the adjacent second equirectangular rectangular projection graphs comprises:
acquiring brightness values and light stream data of pixels in the stitching sides of adjacent primary second equirectangular rectangular projection graphs and secondary second equirectangular rectangular projection graphs; and
determining the stitching positions of the primary second equirectangular rectangular projection graphs and the secondary second equirectangular rectangular projection graphs according to a brightness value change amplitude and a light stream data change smoothness of pixels in the stitching sides of the primary second equirectangular rectangular projection graphs relative to corresponding pixels in the stitching sides of the secondary second equirectangular rectangular projection graphs.

7. The panoramic image stitching method according to claim 6, wherein the secondary second equirectangular rectangular projection graphs is acquired by performing rotation transformation on the first equirectangular rectangular projection graph of each partial panoramic image according to the disposing position of each lens in the multi-lens panoramic camera, and the stitching positions of the primary second equirectangular rectangular projection graphs and the secondary second equirectangular rectangular projection graphs are determined according to the following formula;

$$\operatorname*{argmin}_{(\Delta x, \Delta y)_{i,j}} \sum_{(i,j)} \|I_2(i, j) - I_2(i + \Delta x_{i,j}, j + \Delta y_{i,j})\|_2 +$$
$$\omega \sum_{(i,j)} \sum_{(u,v) \in N(i,j)} \|(\Delta x, \Delta y)_{i,j} - (\Delta x, \Delta y)_{u,v}\|_2$$

wherein $I_2(i,j)$ is a brightness value of a pixel at a coordinate (i,j) of each secondary second equirectangular rectangular projection graph; $I_1(i+\Delta x_{i,j}, j+\Delta y_{i,j})$ is a brightness value of a pixel at a coordinate $(i+\Delta x_{i,j}, j+\Delta y_{i,j})$ of each primary second equirectangular rectangular projection graph; $\Delta x_{i,j}$ is x-axis light stream data of a pixel at a coordinate (i,j) of each primary second equirectangular rectangular projection graph; $\Delta y_{i,j}$ is y-axis light stream data of the pixel at the coordinate (i,j) of each primary second equirectangular rectangular projection graph; $\Delta x_{u,v}$ is x-axis light stream data of a pixel at a coordinate (u,v) of each secondary second equirectangular rectangular projection graph; $\Delta y_{u,v}$ is y-axis light stream data of the pixel at the coordinate (u, v) of each secondary second equirectangular rectangular projection graph; and ω is a smoothness constant.

8. The panoramic image stitching method according to claim 1, wherein the step of determining the stitching results of other panoramic image frames in the nth group of panoramic image frames according to the stitching result of the first panoramic image frame in the (n+1)th group of panoramic image frames and the stitching result of the first panoramic image frame in the nth group of panoramic image frames comprises:
using a difference algorithm to determine the stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

9. A panoramic image stitching apparatus configured to perform stitching operation on panoramic images taken by each lens in a multi-lens panoramic camera, the apparatus comprising:
a processor, configured to:
acquire a partial panoramic image taken by each lens;
perform equirectangular expansion on each partial panoramic image to acquire a first equirectangular rectangular projection graph of each partial panoramic image;
perform rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph;

adjust stitching positions of the adjacent second equirectangular rectangular projection graphs according to pixel light streams in the stitching sides of adjacent second equirectangular rectangular projection graphs, and perform stitching operation on the second equirectangular rectangular projection graphs according to the adjusted stitching positions;

acquire the stitching operation time of performing stitching operation on one panoramic image frame;

group all the panoramic image frames according to the stitching operation time and a panoramic image frame playing speed; and perform stitching operation on a first panoramic image frame in each group, and acquiring a stitching result of the first panoramic image frame in each group; and determining stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

10. The panoramic image stitching apparatus according to claim 9, wherein the processor configured to:

acquiring spherical coordinate parameters of pixels of each partial panoramic image based on lens parameters of the multi-lens panoramic camera;

acquiring spherical rectangular coordinates of the pixels of the partial panoramic image according to the spherical coordinate parameters of the pixels of each partial panoramic image; and transforming the spherical rectangular coordinates of the pixels of each partial panoramic image into planimetric rectangular coordinates of pixels of the corresponding first equirectangular rectangular projection graph according to a preset equirectangular expansion formula.

11. The panoramic image stitching apparatus according to claim 10, wherein the processor configured to:

acquiring spherical coordinates of the pixels of each partial panoramic image according to the spherical coordinate parameters of the pixels of each partial panoramic image, which are acquired based on the lens parameters of the multi-lens panoramic camera, by using the following formulas:

$x = \sin(kr) \times \sin(\alpha)$;

$y = \sin(kr) \times \cos(\alpha)$;

$z = \cos(kr)$;

wherein r is a radial distance of the spherical coordinates of the pixels of each partial panoramic image; α is an azimuth angle of the spherical coordinates of the pixels of each partial panoramic image; k is a fisheye lens distortion parameter of the multi-lens panoramic camera; x is a spherical rectangular horizontal coordinate of the pixels of each partial panoramic image; y is a spherical rectangular longitudinal coordinate of the pixels of each partial panoramic image; and z is a spherical rectangular vertical coordinate of the pixels of each partial panoramic image.

12. The panoramic image stitching apparatus according to claim 10, wherein each partial panoramic image is taken by the each lens of the multi-lens panoramic camera, and the processor configured to:

acquiring the planimetric rectangular coordinates of the pixels of each first equirectangular rectangular projection graph by transforming the spherical rectangular coordinates of the pixels of each partial panoramic image using the following formulas:

$$u_{equi} = \mathrm{atan}\left(\frac{x}{\sqrt{x^2+z^2}}\right) * image1Width;$$

$$v_{equi} = \mathrm{atan}(y/z) * image1Height;$$

wherein x is a spherical rectangular horizontal coordinate of the pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; $u_{equi}$ is a planimetric rectangular horizontal coordinate of pixels of each first equirectangular rectangular projection graph; and $v_{equi}$ is a planimetric rectangular longitudinal coordinate of the pixels of each first equirectangular rectangular projection graph.

13. The panoramic image stitching apparatus according to claim 9, wherein the processor configured to:

performing rotation transformation on the first equirectangular rectangular projection graph of each partial panoramic image to obtain the second equirectangular rectangular projection graph by using the following formulas:

$$u_{equi} = \mathrm{atan}\left(\frac{x}{\sqrt{x^2+z^2}}\right) * image1Width;$$

$$v_{equi} = \mathrm{atan}(y/z) * image1Height;$$

$$p(x, y, z) = P;$$

$$R = \begin{bmatrix} 1 & 0 & 0 \\ 0 & 0 & -1 \\ 0 & 1 & 0 \end{bmatrix};$$

$$p_{flow-equi}(x_{flow-equi}, y_{flow-equi}, z_{flow-equi}) = R \cdot P;$$

$$u_{flow-equi} = \mathrm{atan}\left(\frac{x_{flow-equi}}{\sqrt{x_{flow-equi}^2 + z_{flow-equi}^2}}\right) * image2Width;$$

$$v_{flow-equi} = \mathrm{atan}(y_{flow-equi}/z_{flow-equi}) * image2Height$$

wherein x is a spherical rectangular horizontal coordinate of pixels of each partial panoramic image; y is a spherical rectangular longitudinal coordinate of the pixels of each partial panoramic image; z is a spherical rectangular vertical coordinate of the pixels of each partial panoramic image; image1Width is an image width of each first equirectangular rectangular projection graph; image1Height is a height of each first equirectangular rectangular projection graph; image2Width is an image width of each second equirectangular rectangular projection graph; image2Height is a height of each second equirectangular rectangular projection graph; $u_{equi}$ is a planimetric rectangular horizontal coordinate of pixels of each first equirectangular rectangular projection graph; $v_{equi}$ is a planimetric rectangular longitudinal coordinate of the pixels of each first equirectangular rectangular projection graph; $u_{flow-equi}$ is a planimetric rectangular horizontal coordinate of pixels of each second equirectangular rectangular projection graph; $v_{flow-equi}$ is a planimetric rectangular longitudinal coordinate of the pixels of each second equirectangular rectangular projection graph.

14. The panoramic image stitching apparatus according to claim 9, wherein the processor configured to:
   acquiring brightness values and light stream data of pixels in the stitching sides of adjacent primary second equirectangular rectangular projection graphs and secondary second equirectangular rectangular projection graphs; and
   determining the stitching positions of the primary second equirectangular rectangular projection graphs and the secondary second equirectangular rectangular projection graphs according to a brightness value change amplitude and a light stream data change smoothness of pixels in the stitching sides of the primary second equirectangular rectangular projection graphs relative to corresponding pixels in the stitching sides of the secondary second equirectangular rectangular projection graphs.

15. The panoramic image stitching apparatus according to claim 14, wherein the processor configured to:
   determining the stitching positions of the primary second equirectangular rectangular projection graphs and the secondary second equirectangular rectangular projection graphs, which are acquired by performing rotation transformation on the first equirectangular rectangular projection graph of each partial panoramic image according to the disposing position of each lens in the multi-lens panoramic camera, and, by using the following formulas:

$$\operatorname*{argmin}_{(\Delta x, \Delta y)_{i,j}} \sum_{(i,j)} \|I_2(i,j) - I_2(i + \Delta x_{i,j}, j + \Delta y_{i,j})\|_2 + \omega \sum_{(i,j)} \sum_{(u,v) \in N(i,j)} \|(\Delta x, \Delta y)_{i,j} - (\Delta x, \Delta y)_{u,v}\|_2$$

wherein $I_2(i,j)$ is a brightness value of a pixel at a coordinate $(i,j)$ of each secondary second equirectangular rectangular projection graph; $I_1(i+\Delta x_{i,j}, j+\Delta y_{i,j})$ is a brightness value of a pixel at a coordinate $(i+\Delta x_{i,j}, j+\Delta y_{i,j})$ of each primary second equirectangular rectangular projection graph; $\Delta x_{i,j}$ is x-axis light stream data of a pixel at a coordinate $(i,j)$ of each primary second equirectangular rectangular projection graph; $\Delta y_{i,j}$ is y-axis light stream data of the pixel at the coordinate $(i,j)$ of each primary second equirectangular rectangular projection graph; $\Delta x_{u,v}$ is x-axis light stream data of a pixel at a coordinate $(u,v)$ of each secondary second equirectangular rectangular projection graph; $\Delta y_{u,v}$ is y-axis light stream data of the pixel at the coordinate $(u,v)$ of each secondary second equirectangular rectangular projection graph; and $\omega$ is a smoothness constant.

16. The panoramic image stitching apparatus according to claim 1, wherein the panoramic image stitching apparatus further configured to:
   using a difference algorithm to determine the stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

17. A non-transitory storage medium, having instructions executable by a processor stored therein, wherein the processor executes the instructions to provide a panoramic image stitching method comprising:
   acquiring a partial panoramic image taken by each lens;
   performing equirectangular expansion on each partial panoramic image to acquire a first equirectangular rectangular projection graph of each partial panoramic image;
   performing rotation transformation on the first equirectangular rectangular projection graph of each partial panoramic image according to a disposing position of each lens in the multi-lens panoramic camera to obtain a second equirectangular rectangular projection graph, wherein a stitching band of each second equirectangular rectangular projection graph is located on a stitching side of the second equirectangular rectangular projection graph;
   adjusting stitching positions of the adjacent second equirectangular rectangular projection graphs according to pixel light streams in the stitching sides of adjacent second equirectangular rectangular projection graphs, and performing stitching operation on the second equirectangular rectangular projection graphs according to the adjusted stitching positions;
   acquiring the stitching operation time of performing stitching operation on one panoramic image frame;
   grouping all the panoramic image frames according to the stitching operation time and a panoramic image frame playing speed; and
   performing stitching operation on a first panoramic image frame in each group, and acquiring a stitching result of the first panoramic image frame in each group; and determining stitching results of other panoramic image frames in the nth group of panoramic image frames according to the stitching result of the first panoramic image frame in the (n+1)th group of panoramic image frames and the stitching result of the first panoramic image frame in the nth group of panoramic image frames.

* * * * *